United States Patent [19]

Farnsworth

[11] 4,158,267

[45] Jun. 19, 1979

[54] LITTLE BUGGER INSECT CARRYING AND DISPENSING CONTAINER

[76] Inventor: Charles W. Farnsworth, 27 S. Second St., Frackville, Pa. 17931

[21] Appl. No.: 713,031

[22] Filed: Sep. 24, 1976

[51] Int. Cl.² ............................................. A01K 97/04
[52] U.S. Cl. ........................................................ 43/55
[58] Field of Search ............................................ 43/55

[56] References Cited

U.S. PATENT DOCUMENTS

| | | | |
|---|---|---|---|
| 2,620,588 | 12/1952 | Critser | 43/55 |
| 2,790,266 | 4/1957 | Williamson | 43/55 |
| 4,030,226 | 6/1977 | Shelton, Sr. et al. | 43/55 |

Primary Examiner—Clifford D. Crowder

[57] ABSTRACT

A container comprising two separate and equally sized chambers both of which are used to carry insects utilized in the sport of fishing. Both chambers comprise independent openings at each lateral extremity and are utilized to segregate insects of different types. To insert or remove insects, a threaded screw type cap is provided for each opening.

1 Claim, 2 Drawing Figures

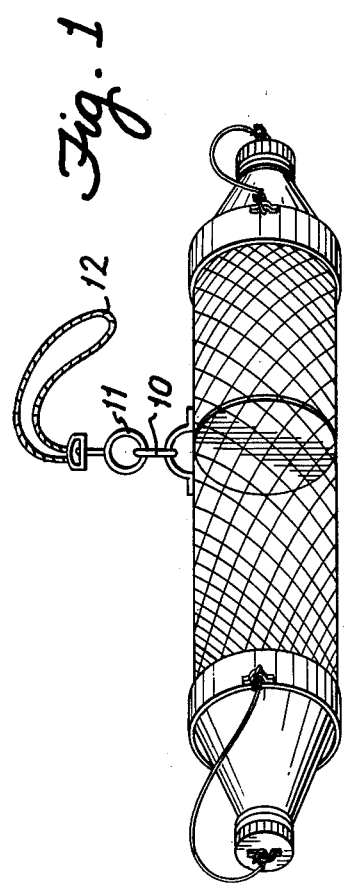
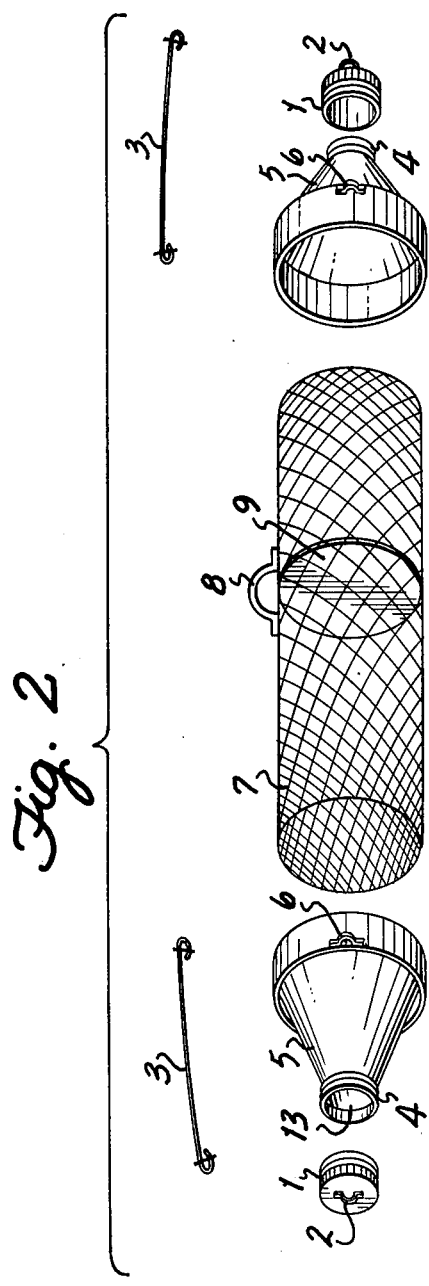

LITTLE BUGGER INSECT CARRYING AND DISPENSING CONTAINER

BACKGROUND OF THE INVENTION

This invention pertains to devices for carrying live bait to be used in fishing. The insects are to be transported in such a manner that different types of bait are kept separated. It is desired to provide a means for accomplishing this end.

SUMMARY OF THE INVENTION

The invention comprises a cylindrical container of wire or other mesh. The container is divided into two separate compartments by a partition to allow segregation of different types of insects. An opening is provided at each end of the container; one for each compartment. A cap is provided for each opening and each cap is attached to the container by a cord to prevent loss. A carrying strap is attached to the container for ease of transport.

BRIEF DESCRIPTION OF THE DRAWING

FIG. 1 is an overall view of the container of the invention;

FIG. 2 is an exploded view of the container of FIG. 1.

DESCRIPTION OF THE PREFERRED EMBODIMENT

The container comprises a cylindrical body portion 7, as seen in FIGS. 1 and 2, formed of wire mesh, for example. A funnel-shaped end portion 5 is attached at each end of the cylindrical body portion 7 by suitable means. The funnel-shaped end portion may be the top of a dry gas can, for example. The end portions 5 are tapered away from the central body portion 7 and are provided with threaded neck portions 4 and apertures 13. There is a removable cap 1 provided for each threaded neck portion 4. To prevent loss of the caps 1, each is connected to its respective funnel-shaped end portion 5 by a cord 3, such as gut or 40 lb. nylon cord, attached at 2 to the cap 1 and at 6 to the end portion 5.

Within the central body portion 7 is provided a solid stationary wall or partition 9 formed of metal, for example. The partition 9 divides the container into two non-communicating chambers so that each may house live bait of different types.

Suitably secured to the outside of central body portion 7 over the partition 9 is an "omega" shaped wire 8 provided for attachment of a carrying strap 12. The strap 12 is connected to the wire 8 by suitable, conventional means such as hook swivel arrangement 10, 11 as shown in FIG. 1. The provision of hooks 2, 6 at each end and the one 8 in the center provide alternative ways of carrying the container.

The mesh for the container may be metal wire or wire dipped in rubber and plastic, etc., or it could be made from fiberglass or equivalent material.

What I claim is:

1. A live bait container for transporting insects utilized in the sport of fishing comprising:

A central body portion having a cylindrical wall formed of mesh material; an end portion fastened at each end of the cylindrical wall and having a funnel-shaped body portion tapering outwardly from the central body portion;

A partition fastened inside the central body portion at the middle portion thereof and dividing the interior of the central body portion into two separate and equally sized chambers;

a neck portion in the outer end of each of the end portions and threaded to receive a cap;

A threaded cap for each neck portion;

A fastening cord attached between each cap and its related end portion to prevent loss of the cap;

A wire support attached at the outside of the middle of the body portion over the dividing partition;

A carrying strap fastened to said wire support to enable the container to be easily transported;

whereby different insects may be simultaneously carried in the separate compartments and selectively released through the separately capped end portions.

* * * * *